(12) United States Patent
McKee et al.

(10) Patent No.: US 11,576,535 B2
(45) Date of Patent: Feb. 14, 2023

(54) HAND CLEANING SYSTEMS

(71) Applicant: B/E Aerospace, Inc., Winston Salem, NC (US)

(72) Inventors: Jefferey McKee, Duvall, WA (US); Travis J. Vaninetti, Bothell, WA (US); Michael W. Hensler, Marysville, WA (US); Thomas Munson, Lake Stevens, WA (US); Frank Hashberger, Snohomish, WA (US); Pierre J. Vignal, Mill Creek, WA (US); Sanjay Bajekal, Simsbury, CT (US)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 17/340,970

(22) Filed: Jun. 7, 2021

(65) Prior Publication Data
US 2021/0378460 A1    Dec. 9, 2021

Related U.S. Application Data

(60) Provisional application No. 63/035,505, filed on Jun. 5, 2020.

(51) Int. Cl.
*A47K 5/12* (2006.01)

(52) U.S. Cl.
CPC .......... *A47K 5/1217* (2013.01); *A47K 5/1202* (2013.01)

(58) Field of Classification Search
CPC .... A47K 5/1217; A47K 5/1202; B64D 11/00; B64D 11/02
See application file for complete search history.

(56) References Cited

U.S. PATENT DOCUMENTS

| 4,921,131 A | * | 5/1990 | Binderbauer | ........ | A47K 5/1217 222/105 |
| 4,938,384 A | * | 7/1990 | Pilolla | .................. | A47K 5/1217 250/221 |

(Continued)

FOREIGN PATENT DOCUMENTS

| AU | 783461 B2 | 10/2005 |
| EP | 2216100 A1 | 8/2010 |
| WO | 2018050250 A1 | 3/2018 |

OTHER PUBLICATIONS

Eirtech Aviation Services: "Aircraft Hand Sanitizer Modification Package", Apr. 1, 2020.

(Continued)

*Primary Examiner* — Donnell A Long
(74) *Attorney, Agent, or Firm* — Locke Lord LLP; Scott D. Wofsy; Alicia J. Carroll

(57) ABSTRACT

An integrated hand cleaning system includes a hand cleaning housing including dispensing spout and a sensor. An actuator is operatively connected to the housing. A cleaning substance reservoir is in fluid communication with the dispensing spout. A controller is operatively connected to the sensor and to the actuator. The controller is configured to activate the actuator based on detection of a user's hand by the sensor. A method for controlling a hand cleaning system includes receiving, with a controller, a sensor signal from a sensor in a hand cleaning housing. The method includes activating an actuator of a hand cleaning system with the controller based on the sensor signal.

20 Claims, 2 Drawing Sheets

(56) References Cited

U.S. PATENT DOCUMENTS

| | | | |
|---|---|---|---|
| 5,199,118 A * | 4/1993 | Cole | A47K 1/04 |
| | | | 4/619 |
| 5,422,550 A * | 6/1995 | McClanahan | H02P 5/50 |
| | | | 60/420 |
| 6,041,971 A * | 3/2000 | Pineda | A47K 5/1217 |
| | | | 222/181.3 |
| 2002/0185926 A1* | 12/2002 | King | H02P 6/182 |
| | | | 310/68 B |
| 2011/0253744 A1 | 10/2011 | Pelfrey | |
| 2013/0200097 A1 | 8/2013 | Yang et al. | |
| 2019/0246848 A1* | 8/2019 | Elfstrom | G06Q 10/087 |
| 2021/0361126 A1* | 11/2021 | Tran | F16M 11/22 |

OTHER PUBLICATIONS

Extended European Search Report dated Nov. 3, 2021, issued during the prosecution of European Patent Application No. EP 21178015.0.

\* cited by examiner

HAND CLEANING SYSTEMS

CROSS REFERENCE TO RELATED APPLICATIONS

This application claims priority to U.S. Provisional Patent Application No. 63/035,505, filed Jun. 5, 2020. The entire contents of this application are hereby incorporated herein by reference in their entirety.

BACKGROUND

1. Field

The present disclosure relates to hand cleaning, and more particularly to hand cleaning on aircraft.

2. Description of Related Art

Air travel was greatly reduced due to the COVID-19 pandemic and subsequent mitigations. The new landscape of world pandemics may generate a new normal where improving on-board sanitation and cleanliness for passengers and crew is a paramount consideration to ensure the healthy transport of passengers for the future of commercial transportation.

The conventional techniques have been considered satisfactory for their intended purpose. However, there is an ever present need for improved systems and methods for on-board hand cleaning.

SUMMARY

An integrated hand cleaning system includes a hand cleaning housing including dispensing spout and a sensor. An actuator is operatively connected to the housing. A cleaning substance reservoir is in fluid communication with the dispensing spout. A controller is operatively connected to the sensor and to the actuator. The controller is configured to activate the actuator based on detection of a user's hand by the sensor.

In some embodiments, the cleaning substance reservoir includes a plurality of separate portions. Each of the plurality of separate portions can be in selective fluid communication with the dispensing spout depending on a user input. The controller can be configured and adapted to be operatively connected to at least one other lavatory system. The hand cleaning housing can be at least partially mounted on a cabin wall. The cabin wall can divide between a lavatory area and a seating area. The actuator and the sensor can be in electrical communication with at least one power source. The controller can be operatively coupled to at least one other lavatory device. In accordance with another aspect, a hand cleaning system for an aircraft includes a hand cleaning housing mounted to a wall in a cabin of an aircraft. The housing can include a dispensing spout and a sensor. The wall in the cabin can divide between a lavatory area and a seating area. The actuator can be similar to that described above.

In accordance with another aspect, a method for controlling a hand cleaning system includes receiving, with a controller, a sensor signal from a sensor in a hand cleaning housing. The method includes activating an actuator of a hand cleaning system with the controller based on the sensor signal.

The method can include dispensing at least one hand cleaning substance from at least one reservoir through a spout of the hand cleaning housing. The method can include tracking a liquid level of the at least one reservoir with the controller by tracking a count of times dispensing the at least one hand cleaning substance occurs. The method can include sequencing power to the actuator with the controller depending on whether another system is drawing power.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
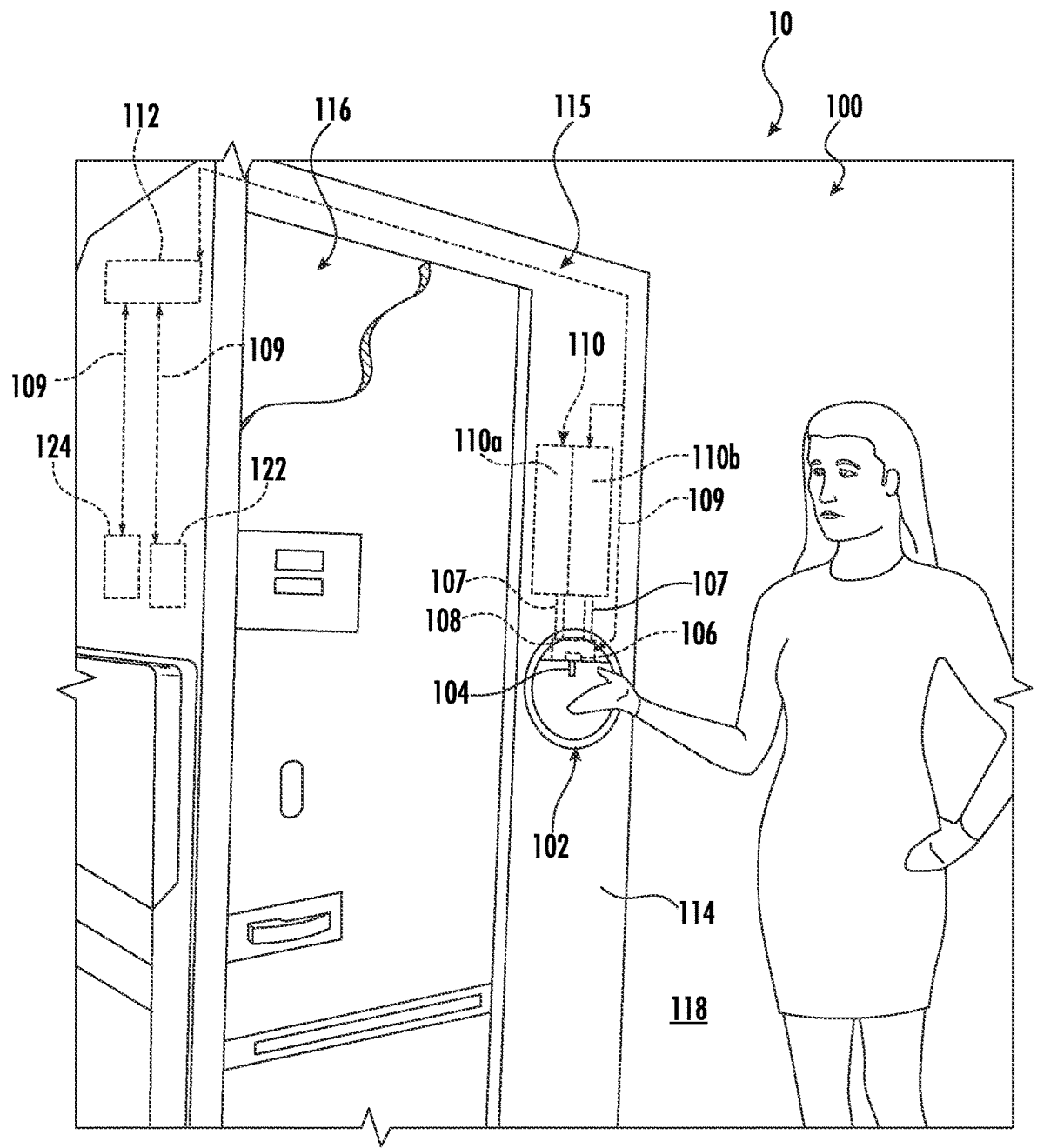
FIG. 1 is a schematic perspective view of an embodiment of an integrated hand cleaning system constructed in accordance with the present disclosure, showing a controller operatively connected to an actuator in a hand cleaning housing.

Reference will now be made to the drawings wherein like reference numerals identify similar structural features or aspects of the subject disclosure. For purposes of explanation and illustration, and not limitation, a view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used for hand cleaning stations integrated into cabin monuments to provide safe continuous option for passengers and crew to take safety precautions and to maintain clean hands and minimize transfer of pathogens such as bacteria and viruses to themselves or others on the flight. Systems and methods described herein also offer an independent flight-worthy hand cleaning unit for mounting on a cabin wall. These systems negate the need for passengers or crew to bring their own materials on-board.

Figure 2:
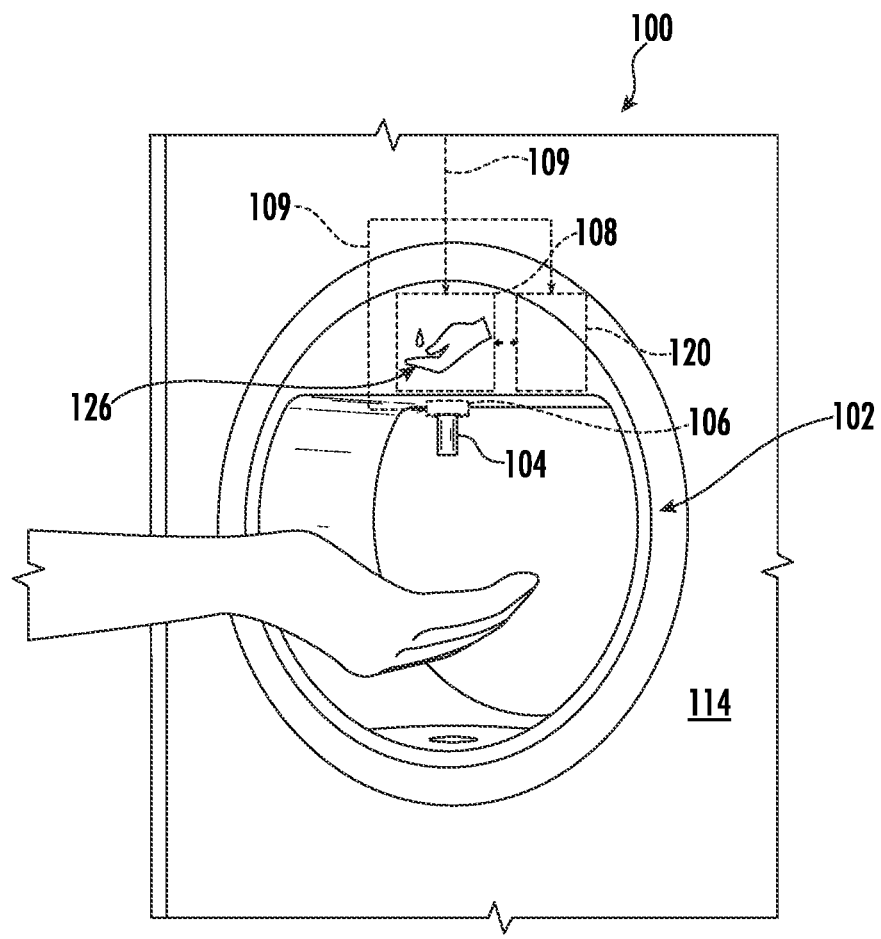
FIG. 2 is a schematic perspective view of a portion of the system of FIG. 1, showing the hand cleaning housing, sensor and spout.

As shown in FIGS. 1-2, an integrated hand cleaning system 100 includes a hand cleaning housing 102 including dispensing spout 104 and a sensor 106. Integrated hand cleaning system 100 provides a touchless option that can be installed as an embedded feature for passenger and cabin crew use. The integrated hand cleaning system 100 provides an airworthy part of an aircraft 10, which includes meeting EMF requirements, flammability requirements and the like. In FIG. 1, integrated system 100 is shown as an installation on the exterior of a lavatory 115. Those skilled in the art will readily appreciate that system 100 can be integrated into walls of galleys, partitions and other monuments. An actuator 108 is operatively connected to the housing 102. A cleaning substance reservoir 110 is in fluid communication with the dispensing spout 104 via one or more conduits 107. Reservoir 110 is shown as a remote reservoir, e.g. not within the hand cleaning housing 102. Those skilled in the art, however, will appreciate that the reservoir 110 can be a local or remote reservoir 110 of liquid to support the spout 104. The actuator 108 and the sensor 106 are in electrical communication with at least one power source 120. Power source 120 is shown as a battery. Those skilled in the art will readily appreciate that power source 120 could be a power line in electrical connection with aircraft power, or can be part of an energy harvesting device (e.g. vibrations, or light), or any other suitable power source.

With continued reference to FIGS. 1 and 2, the hand cleaning housing 102 is at least partially mounted on a cabin wall 114. The housing 102 is constructed from a non-flammable material, e.g. stainless steel, or the like. The cabin wall 114 is dividing between a lavatory area 116 and a seating area 118. The hand cleaning housing 102 is mounted to face outwards relative to the lavatory area 116, towards the seating area 118. This will allow a passenger or crew member to clean their hands within a lavatory 115 and then clean them on the way back to their seats. This will help mitigate or avoid pathogens that may have been acquired by surfaces touched as the passenger leaves lavatory 115.

As shown in FIGS. 1 and 2, a controller 112 is operatively connected to the battery 120, the sensor 106 and to the actuator 108 via communication and/or power lines 109 to send power or data/commands thereto and/or receive power or data/commands therefrom. The controller 112 is configured and adapted to activate the actuator 108 based on detection of a user's hand by the sensor 106. The controller 112 and sensor 106 are configured and adapted to distinguish between someone simply walking by the sensor 106 and someone approaching the sensor 106 with their hand, as to not unnecessarily dispense fluid from the reservoir 110. The controller 112 and sensor 106 are also configured and adapted to detect an approaching hand or user such that the response time from the actuator 108 once a user's hand is in position under the spout 104 is shortened. The controller 112 is a central controller for lavatory 115 and is operatively connected to other lavatory systems via communication/power lines 109 to receive data therefrom and/or send commands/data thereto, such as, a soap dispenser 122 or lotion dispenser 124. In this way, controller 112 can monitor and control a plurality of different lavatory systems. By having a single controller 112 control multiple lavatory systems, wiring and power needs can be reduced and processing can be made more efficient.

With continued reference to FIGS. 1 and 2, cleaning substance reservoir 110 includes a plurality of separate portions 110*a* and 110*b*. Each of the plurality of separate portions 110*a* and 110*b* are in selective fluid communication with the dispensing spout 104 depending on a user input. Each portion 110*a* and 110*b* can contain a different cleaning substance, e.g. different scents of hand sanitizer, different strengths of hand sanitizer, or the like. In some embodiments, a user interface 126 is operatively connected to the controller 112 to convey a user selection of the type of cleaning substance desired to the controller 112, such that the controller 112 can then activate the actuator 108 to dispense the cleaning substance from a given portion (110*a* or 110*b*) of the reservoir 110.

A method for controlling a hand cleaning system includes receiving, with a controller, e.g., controller 112 or 212, a sensor signal from a sensor, e.g. sensor 106 or 206, in a hand cleaning housing, e.g., housing 102 or 202. The method includes activating an actuator, e.g., actuator 108 or 208, of a hand cleaning system with the controller based on the sensor signal. When a user places their hand under the sensor the actuator is triggered by the controller and provides a dose of the hand clean fluid or substance, e.g. a hand cleaning sanitizer, to wipe over hands.

The method includes dispensing at least one hand cleaning substance from at least one reservoir through a spout, e.g., spout 104 or 204, of the hand cleaning housing by sending a dispensing command from the controller to the actuator. The method includes tracking a liquid level of the at least one reservoir with the controller by tracking a count of the number of times the dispensing command is sent. In this way, by knowing the start volume of the reservoir and knowing the volume dispensed upon each dispense command, the controller can track a reservoir level and send a signal to crew interface, maintenance interface, or the like, when the reservoir needs to be refilled. The controller is also configured and adapted to monitor other product health management (PHM) aspects. For example, depending on the number of dispensing commands sent, the controller can estimate the life left on the actuator, battery, or the like. The estimate made by the controller can be generated by comparing the number of dispense commands sent to an expected number of dispense commands recommended for the life of a given component.

While the method above describes algorithmic ways of the controller monitoring the status of various components of system 100, those skilled in the art will appreciate that additional sensors operatively connected to the controller can also be used. For example, the controller can monitor battery life with a state of charge sensor or the like, and can monitor the reservoir with a liquid level sensor, or the like. The method includes sequencing power to the actuator with the controller depending on whether another system is drawing power. This sequencing is beneficial because the controller acts as a central system to avoid over consumption of power across the entire lavatory system.

Figure 3:
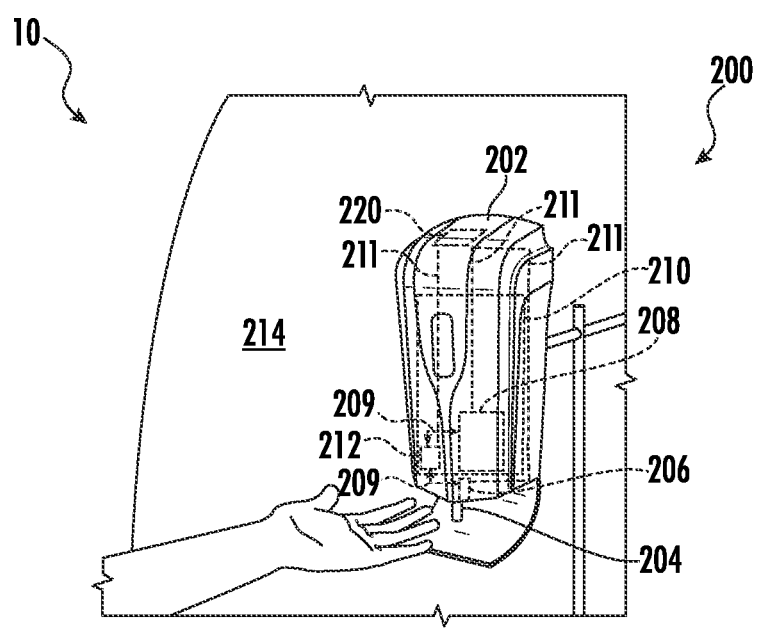
FIG. 3 is a schematic perspective view of another embodiment of a hand cleaning system constructed in accordance with the present disclosure, showing a hand cleaning housing.

As shown in FIG. 3, another embodiment of a hand cleaning system 200 for an aircraft 10 is shown. System 200 is an independent hand cleaning system with an independent controller 212 contained within a hand cleaning housing 202. The hand cleaning system 200 is an airworthy part of an aircraft 10, which includes meeting EMF requirements, flammability requirements and the like. Hand cleaning housing 202 is mounted to a wall 214 in a cabin of an aircraft 10. Housing 202 can be constructed from stainless steel, or other flame-resistant material. The wall 214 in the cabin divides between a lavatory area and a seating area, similar to wall 114, described above. Those skilled in the art will readily appreciate that the independent nature of the system 200 allows for easy installation on existing monuments or walls within an aircraft. The housing 202 includes dispensing spout 204 and a sensor 206. The hand cleaning system 200 for an aircraft includes an actuator 208 operatively connected to the housing 202 and in communication with controller 212 to receive power or data therefrom and/or send data thereto, as shown schematically by arrow 209. Sensor 206 is also in communication with controller 212 to receive data therefrom and/or send data thereto, as shown schematically by arrow 209. A power source 220 is electrically connected to sensor 206, actuator 208, and controller 212 via one or more electrical connections 211. Power source 220 can be a battery, or energy harvesting device (e.g. UV powered or vibration powered). The hand cleaning system 200 includes a cleaning substance reservoir 210 in fluid communication with the dispensing spout 204. Similar to reservoir 110, reservoir 210 can also include separate portions in the event more than one type of cleaning substance, e.g., hand sanitizer, is desired. Controller 212 is also in communication with reservoir 210 to receive data therefrom or send data/commands thereto. Similar to controller 112, controller 212 acts to monitor and/or send commands to various components in system 200, e.g. sensor 206, actuator 208, power source 220, and/or reservoir 210.

The methods and systems of the present disclosure, as described above and shown in the drawings, provide for reduction or elimination of pathogens from the hands of passengers and crew members, thereby increasing the overall cleanliness of the aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An integrated hand cleaning system comprising:
a hand cleaning housing including dispensing spout and a sensor;
an actuator operatively connected to the housing;
a cleaning substance reservoir in fluid communication with the dispensing spout; and
a controller operatively connected to at least one other lavatory device, to the sensor and to the actuator, wherein the actuator and the sensor are in electrical communication with at least one power source, wherein the controller is configured and adapted to sequence power to the actuator with the controller depending on whether the at least one other lavatory device is drawing power, wherein the controller is configured to activate the actuator based on detection of a user's hand by the sensor.

2. The system as recited in claim 1, wherein the cleaning substance reservoir includes a plurality of separate portions, each of the plurality of separate portions in selective fluid communication with the dispensing spout depending on a user input.

3. The system as recited in claim 1, wherein the controller is configured and adapted to be operatively connected to at least one other lavatory system.

4. The system as recited in claim 1, wherein the hand cleaning housing is at least partially mounted on a cabin wall.

5. The system as recited in claim 4, wherein the cabin wall is dividing between a lavatory area and a seating area.

6. The system as recited in claim 1, wherein the hand cleaning housing is made from a non-flammable material.

7. The system as recited in claim 1, wherein the hand cleaning housing is made from stainless steel.

8. The system as recited in claim 1, wherein the reservoir is outside of the hand-cleaning housing.

9. The system as recited in claim 1, wherein the power source is at least one of a vibration or UV harvesting energy device.

10. A hand cleaning system for an aircraft, the hand cleaning system comprising:
a hand cleaning housing mounted to a wall in a cabin of an aircraft, the housing including dispensing spout and a sensor;
an actuator operatively connected to the housing; and
a cleaning substance reservoir in fluid communication with the dispensing spout;
a controller operatively connected to at least one other lavatory device, to the sensor and to the actuator, wherein the actuator and the sensor are in electrical communication with at least one power source, wherein the controller is configured and adapted to sequence power to the actuator with the controller depending on whether the at least one other lavatory device is drawing power.

11. The system as recited in claim 10, wherein the cleaning substance reservoir includes a plurality of separate portions, each of the plurality of separate portions in selective fluid communication with the dispensing spout depending on a user input.

12. The system as recited in claim 10, wherein the wall in the cabin divides between a lavatory area and a seating area.

13. The system as recited in claim 10, wherein the hand cleaning housing is made from a non-flammable material.

14. The system as recited in claim 10, wherein the hand cleaning housing is made from stainless steel.

15. The system as recited in claim 10, wherein the reservoir is outside of the hand-cleaning housing.

16. A method for controlling a hand cleaning system, the method including:
receiving, with a controller, a sensor signal from a sensor in a hand cleaning housing; and
activating an actuator of a hand cleaning system with the controller based on the sensor signal; and
sequencing power to the actuator with the controller depending on whether another lavatory device is drawing power.

17. The method as recited in claim 16, further comprising dispensing at least one hand cleaning substance from at least one reservoir through a spout of the hand cleaning housing.

18. The method as recited in claim 17, further comprising tracking a liquid level of the at least one reservoir with the controller by tracking a count of times dispensing the at least one hand cleaning substance occurs.

19. The method as recited in claim 16, further comprising tracking an actuator life of the actuator with the controller by tracking a count of times dispensing the at least one hand cleaning substance occurs.

20. The system as recited in claim 10, wherein the power source is at least one of a vibration or UV harvesting energy device.

* * * * *